(12) United States Patent
Chandran et al.

(10) Patent No.: US 7,408,877 B2
(45) Date of Patent: *Aug. 5, 2008

(54) METHOD AND APPARATUS FOR APPLYING QUALITY OF SERVICE TO MULTICAST STREAMS TRANSMITTED IN A CABLE NETWORK

(75) Inventors: Kartik S. Chandran, Mountain View, CA (US); Prashant Gandhi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 392 days.

This patent is subject to a terminal disclaimer.

(21) Appl. No.: 11/327,006

(22) Filed: Jan. 6, 2006

(65) Prior Publication Data

US 2006/0120369 A1 Jun. 8, 2006

Related U.S. Application Data

(63) Continuation of application No. 09/752,885, filed on Dec. 28, 2000, now Pat. No. 7,012,891.

(51) Int. Cl.
*H04L 12/26* (2006.01)
(52) U.S. Cl. .................................. 370/230; 370/432
(58) Field of Classification Search .................. 370/229, 370/230, 235, 236, 236.1, 252, 395.2, 295.21, 370/432
See application file for complete search history.

(56) References Cited

U.S. PATENT DOCUMENTS

| 5,862,451 | A | 1/1999 | Grau et al. |
| 5,930,259 | A | 7/1999 | Katsube et al. |
| 6,337,860 | B1 | 1/2002 | Wicklund |
| 6,549,938 | B1 | 4/2003 | Kiikki et al. |
| 6,707,818 | B1 | 3/2004 | Kadambi et al. |
| 6,745,246 | B1 | 6/2004 | Erimli et al. |
| 6,771,673 | B1 | 8/2004 | Baum et al. |
| 6,940,814 | B1 * | 9/2005 | Hoffman ..................... 370/235 |
| 7,274,679 | B2 * | 9/2007 | Amit et al. ................... 370/343 |
| 2005/0198359 | A1 * | 9/2005 | Basani et al. ............... 709/232 |
| 2007/0014334 | A1 * | 1/2007 | Currivan et al. ............. 375/148 |
| 2007/0124488 | A1 * | 5/2007 | Baum et al. .................. 709/230 |
| 2008/0049735 | A1 * | 2/2008 | Kikinis et al. ............... 370/352 |

* cited by examiner

*Primary Examiner*—Ajit G Patel
(74) *Attorney, Agent, or Firm*—Weaver Austin Villeneuve & Sampson LLP (57) ABSTRACT

A method and apparatus for providing quality of service parameters for transmissions of multicast streams on a cable network is provided. A cable network headend connects an external network to a hybrid fiber coax or cable network. The cable network headend maintains a table of cable modems with entries associating each cable modem with one or more quality of service parameters. Virtual cable modem entries are created for multicast streams when indications of quality of service for multicast streams are received by the cable network headend. Multicast packets arriving at the cable network headend are processed using the stored quality of service parameters for the corresponding multicast stream. The multicast packets may then be transmitted, queued, or dropped depending on the specified parameters and traffic shaping or policing algorithms.

20 Claims, 7 Drawing Sheets

METHOD AND APPARATUS FOR APPLYING QUALITY OF SERVICE TO MULTICAST STREAMS TRANSMITTED IN A CABLE NETWORK

CROSS REFERENCE TO RELATED APPLICATIONS

This application is a continuation of U.S. patent application Ser. No. 09/752,885 filed Dec. 28, 2000 now U.S. Pat. No. 7,012,891 entitled "METHOD AND APPARATUS FOR APPLYING QUALITY OF SERVICE TO MULTICAST STREAMS TRANSMITTED IN A CABLE NETWORK". The above-identified application is incorporated herein by reference in its entirety and for all purposes.

BACKGROUND OF THE INVENTION

Broadly speaking, the present invention relates to providing quality of service parameters for data streams. More particularly, the present invention provides a system for implementing quality of service parameters for multicast flows at a cable network headend system. The relevant component in the present invention is the cable network headend, which interprets quality of service parameters in a multicast stream and applies them to packets transmitted onto the cable network.

Quality of service is a qualitative and quantitative set of parameters used to maximize efficiency and specify levels of service in a network. System administrators, service and content providers, among others, can effectively control network usage, reliability, and resources by specifying quality of service parameters. These parameters may include minimum unit delay, maximum unit delay, peak bandwidth, mean bandwidth, minimum bandwidth, latency, priority, jitter, response time, and burst dispersion. Quality of service can also be specified by predefined levels of service. These levels may include controlled delay (where a maximum forwarding delay is set), guaranteed service (where bit rates are predefined), and predictive service (where bit rates are guaranteed for a certain portion of the traffic). Quality of service specifications are particularly important for providing streaming video and audio while still retaining enough bandwidth for other forms of network traffic.

Data Over Cable Service Interface Specification 1.1 (DOCSIS 1.1), includes functionality that allows administrators to provide quality of service for traffic flowing into or out of a cable network and is hereby incorporated by reference for all purposes. The cable modem termination system (CMTS) and its associated routing mechanism connect cable modems to an outside network such as the Internet.

DOCSIS provides an extensive set of quality of service parameters for cable networks. These parameters include not only the ability to specify levels of service, but also provide for the ability to differentiate service for different types of traffic, such as voice or video. Since DOCSIS only provides quality of service parameters on a per cable modem basis however, these parameters are only available for unicast or point-to-point routing. For example, where one client on an external network sends a data file to a client within a cable network, DOCSIS allows the CMTS to determine what quality of service parameters should be associated with the data file packets being transmitted to the cable modem within the cable network.

Figure 1:
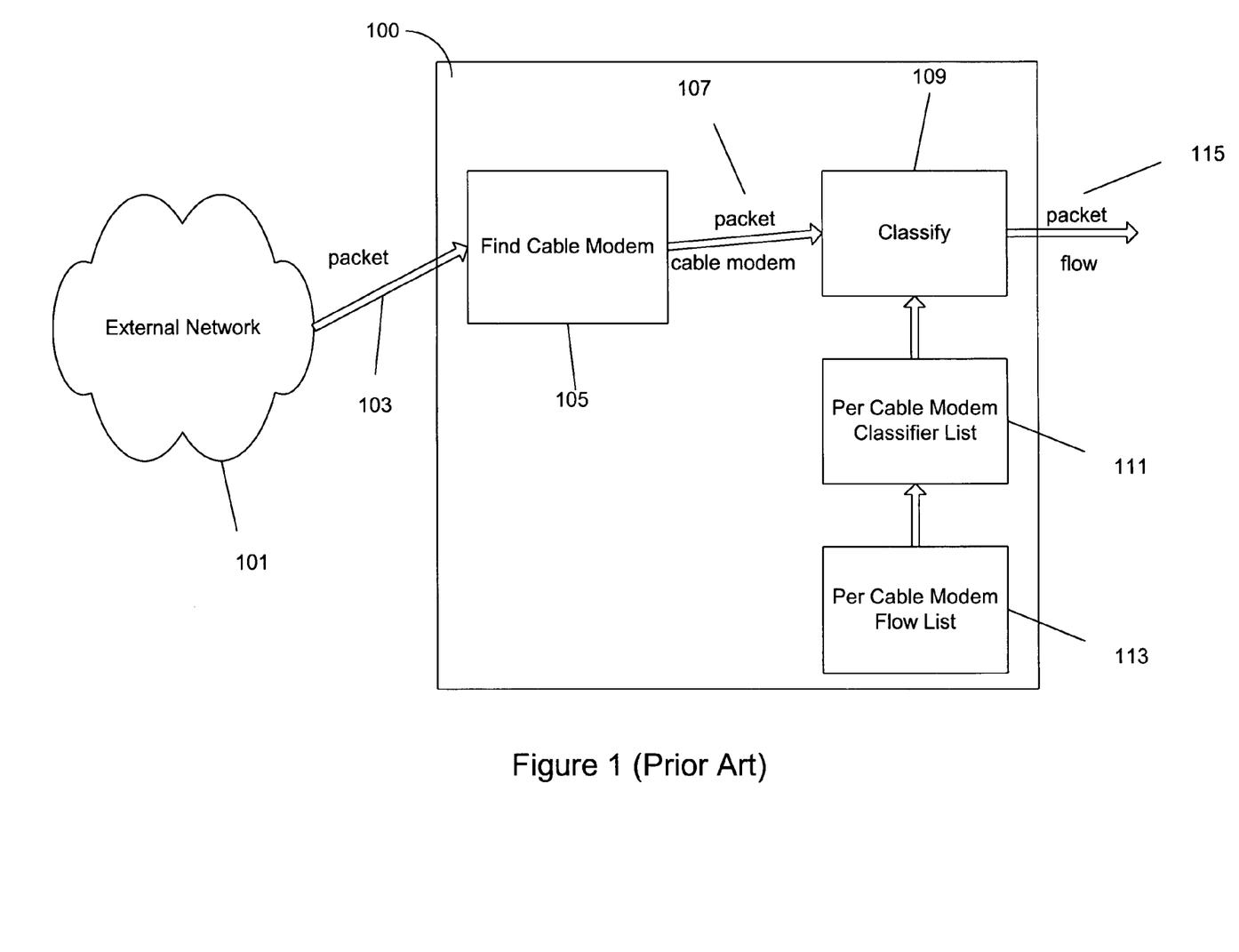
FIG. 1 is a process flow diagram illustrating current packet processing methodology available for cable network headends.

FIG. 1 shows packet processing capabilities specified in DOCSIS 1.1 at a CMTS 100. A packet 103 arrives from an external network 101 such as the Internet. The CMTS 100 recognizes that the destination of the packet lies within the cable network of the CMTS 100. The CMTS 100 locates the recipient cable modem based on packet information and information stored within the CMTS 100. This packet 103 is introduced with its associated cable modem information into a classifier 109. This classifier 109 categorizes the packet based on a classifier list 111 for that particular cable modem. The classifier list 111 may categorize the packet based on criteria such as IP address, protocol type, or port number. Typically, these criteria are chosen to distinguish between different types of traffic such as telephony, web traffic, video, etc. Once the packet has been classified, the CMTS 100 assigns a flow to the packet based on the flow list 113 associated with the particular cable modem. This flow list 113 specifies groups of quality of service parameters. This packet now associated with a flow 115 has quality of service parameters that govern whether the packet should be transmitted downstream, delayed, or dropped. Various traffic shaping and policing algorithms are used in making this determination.

For many applications, it is necessary for one client to send the same information to multiple clients. Although it is possible to send the information to each of the clients point-to-point, this strategy would be a drain on network resources. For example, a unicast transmission of a data packet to a group of 1000 recipients would require periodic transmission of 1000 packets, even though many of the packets would end up traversing the same links. Broadcast transmission of the same packet to a group of 1000 recipients would work if the number of recipients was not that much smaller than the number of total clients on the network. However, in large networks with numerous subnetworks, broadcasting would be a waste of resources for all of the clients not interested in the information. Multicast transmission would be the ideal solution where a data packet needs to be transmitted to a large number of recipients who comprise a small number of total clients on the network. To send a packet to 1000 recipients, multicast transmission only requires a single packet be delivered, although the packet may be replicated at the forks in a multicast delivery tree.

Multicasting was developed to deal with the inefficiencies inherent in broadcasting or point-to-multipoint messaging. A multicast stream would be placed onto a network at a given time by a video server, for example. Although this multicast stream would reside on the network, it would not be transmitted to an end user until an individual client made a request to receive the video stream. If a cable modem user requested the multicast stream, the CMTS or its associated multicast router would seek out and retrieve the stream on the network and prepare to send the information downstream to the cable modem user.

While DOCSIS provides extensive functionality for specifying quality of service provisions for unicast or point-to-point transmissions, DOCSIS provides little or no functionality for specifying quality of service parameters for a multicast stream intended to be received by a number of clients. This shortcoming is particularly serious because both multicasting and cable are technologies that are capable of bringing true streaming video content to the end user.

DOCSIS 1.1 has no provisions for applying different quality of service parameters to different multicast streams. DOCSIS 1.1 only provides that multicast streams will be transmitted based on the best effort model of delivery. The CMTS under this best effort model of delivery essentially guarantees nothing. The CMTS makes no commitment about specific treatment of packets of a certain flow. A transmitted data stream gets what bandwidth is available. If the CMTS and its associated router are congested at the time the video stream arrives, a substantial portion of the video stream packets may be dropped. The best effort model often is sufficient for traditional data applications such as text and graphics transmissions, FTP, telnet and other uses where timeliness is not of the essence. However, new kinds of applications such as video-on-demand or video teleconferencing are highly sensitive to time delays. The traditional best effort method of increasing packet delay in order to improve fairness and correct delivery is currently incapable of reliably transmitting on-demand high bandwidth streams.

Many video content providers may wish to provide very specific video quality levels for their receivers. Video conferencing may need to specify minimum bandwidth requirements, maximum packet delays, or a host of other requirements. DOCSIS does not provide any of these capabilities for multicast transmissions cable or hybrid fiber coaxial networks. At most, DOCSIS 1.1 supports multicast transmissions using IGMP, but without any quality of service guarantees.

SUMMARY OF THE INVENTION

According to the present invention, a cable network headend is provided which satisfies the need for ascribing particular quality of service parameters to particular multicast transmissions.

Guaranteed quality of service is becoming increasingly important, especially for on demand video and real time audio applications. Multicast streams and cable networks have the capability of carrying transmissions that require substantial bandwidth and have specific quality of service requirements. Available protocols allow a cable network headend to specify quality of service parameters on a per cable modem basis. Each cable modem may be allocated a certain bandwidth, have a certain specified average bit rate, or be limited in maximum upstream and downstream transmissions speeds. These quality of service parameters may also vary depending on the type of traffic the cable network headend receives. Voice traffic may be allocated a higher bit rate than web traffic, for example.

Available protocols, however, do not allow content providers to specify quality of service for multicast streams to be transmitted from a cable network headend onto a cable network. Although a multicast stream can reserve bandwidth and specify quality of service while it is being routed to a cable network headend (using many typical network protocols), no quality of service other than best effort can be provided between the cable network headend and the hosts residing in the cable modem network (using DOCSIS 1.1).

The present invention provides adjustable quality of service for multicast transmissions between a cable network headend and hosts on a cable network. In one aspect of the invention, the cable modem receives an indication of quality of service required for a multicast stream from the external network. The cable network headend then creates a "virtual cable modem" for the multicast stream. In one embodiment, the headend records the multicast address (IP and/or MAC) as a virtual cable modem entry in a table of cable modems, in which each virtual cable modem is associated with one of more quality of service parameters.

The cable network headend can then receive a request from a host to receive a multicast stream. As the cable network headend receives this multicast stream, the cable network headend uses the virtual cable modem entry to retrieve quality of service information for the particular packets received. Instead of merely using best effort transmission, these quality of service parameters can be applied to the multicast packets. These packets can then be queued, dropped, or transmitted based on a traffic shaping or policing algorithm.

One aspect of the invention provides a method for providing quality of service parameters at a cable network headend for multicast transmissions to a cable network. The method may be characterized by the following sequence: (1) receiving a level three. communication specifying one or more quality of service parameters for a multicast transmission; (2) creating a virtual cable modem associated with one or more quality of service parameters, thereby controlling the multicast transmission quality of service on the cable network; and (3) providing the multicast transmission on the cable network according to the specified quality of service parameters.

The cable network headend can store the addresses representing the multicast transmission as a virtual cable modem entry in a table of cable modems and associate quality of service information with the multicast stream (as represented by the virtual cable modem). Packets from this multicast stream can then be processed using these quality of service parameters before transmitting these packets downstream onto the cable network.

Another aspect of the invention provides an apparatus for providing quality of service at a cable network headend for multicast streams transmitted onto a cable network. The apparatus may be characterized by the following features: (1) a network interface allowing the apparatus to connect with an external network and receive a stream of multicast content from the external network; (2) a cable network interface allowing the apparatus to connect with a cable network and transmit the stream of multicast content to one or more cable modems on the cable network; and (3) a processor configured or designed to create a virtual cable modem associated with one or more quality of service parameters, thereby controlling the multicast transmission quality of service on the cable network.

The network interface typically connects the apparatus on the upstream end to an external network and the cable network interface connects the apparatus on the downstream end to the hybrid fiber coax or cable network. A table of cable modems contains entries for cable modems residing in the cable network as well as virtual cable modems representing multicast streams. Each of the entries in the table of cable modems can be associated with one or more quality of service parameters for transmission on the cable network.

Another aspect of the invention pertains to computer program products including a machine readable medium on which is stored program instructions, tables or lists, and/or data structures for implementing a method as described above. Any of the methods, tables, or data structures of this invention may be represented as program instructions that can be provided on such computer readable media.

A further understanding of the nature and advantages of the present invention may be realized by reference to the remaining portions of the specification and the drawings.

DETAILED DESCRIPTION OF SPECIFIC EMBODIMENTS

Figure 2:
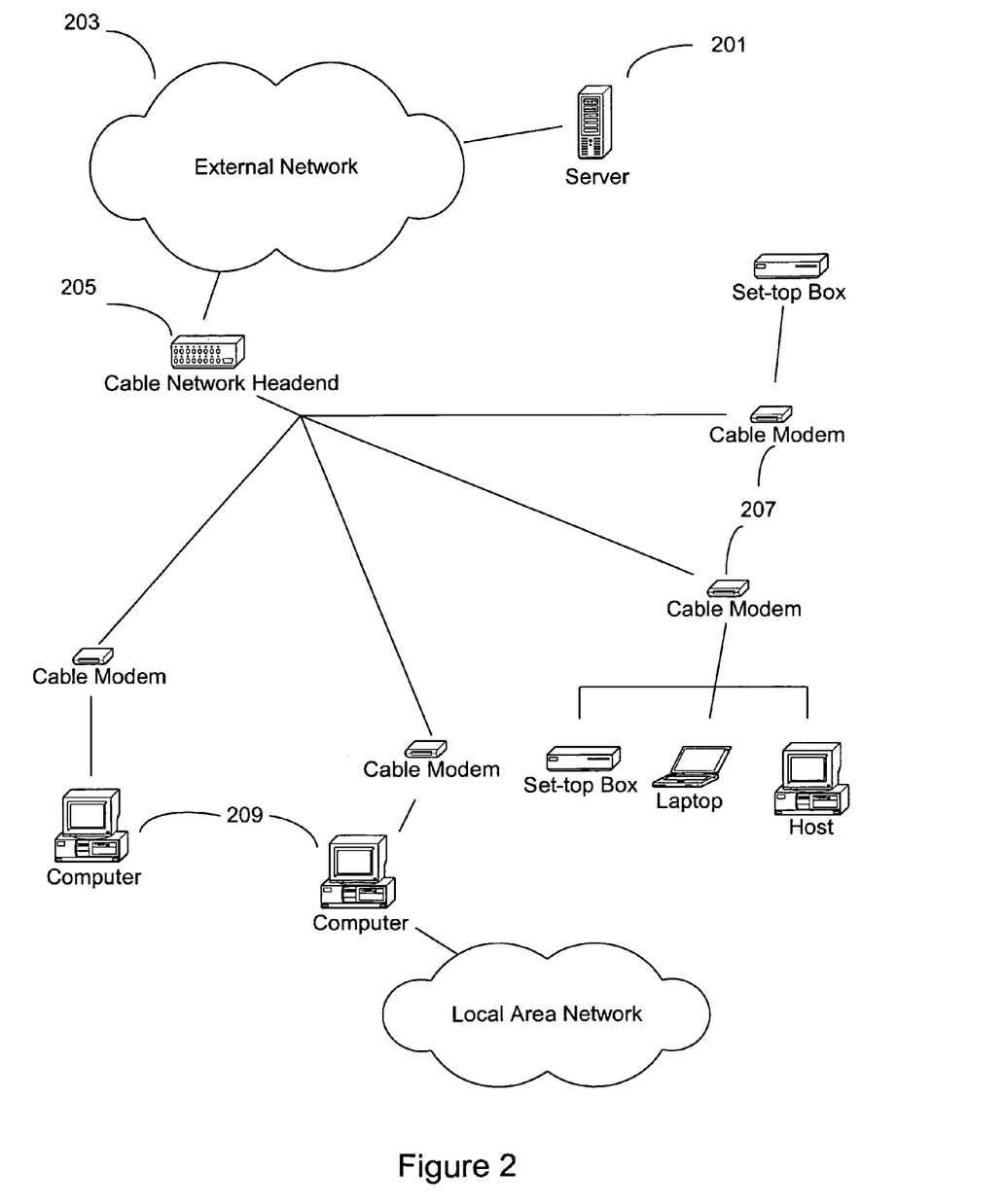
FIG. 2 is a block diagram showing one possible network configuration that may be used in implementing the present invention.

This invention pertains methods and systems for providing various quality of service settings to multicast streams transmitted into a cable network, such as a hybrid fiber coaxial cable network. FIG. 2 presents a network level view of one situation where the present invention is applicable. A cable network headend 205 is connected to an external network 203 on the upstream end and to a series of cable modems 207 on the downstream end. In one embodiment of this invention, the cable network headend 205 can include a cable modem termination system (CMTS). The CMTS may have routing capabilities in itself or it may be associated with a general purpose router or even a multicast router. In a specific embodiment, the CMTS may be one specially configured such as models in the uBR-7200 series of CMTSs available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Each cable modem 207 connected to the CMTS 205 may supply data to one or more individual computers 209. In a scenario of particular interest, server 201 may wish to send a multicast transmission. A multicast transmission is any transmission intended for a group of recipients, e.g. a video program or a telephon conference transmission. Typically, the multicast tranmission is provided via a level 3 protocol that supports such multicast transmissions. Some of these recipients may be ones on the cable network 211 linked to the external network by CMTS 205. Other recipients may lie in other subnetworks connected to the external network. Recipients of a multicast transmission can also change dynamically. An individual computer 209 may wish to dynamically join a video conference in mid-session. Others may wish to leave a multicast transmission or switch to another one.

Figure 3:
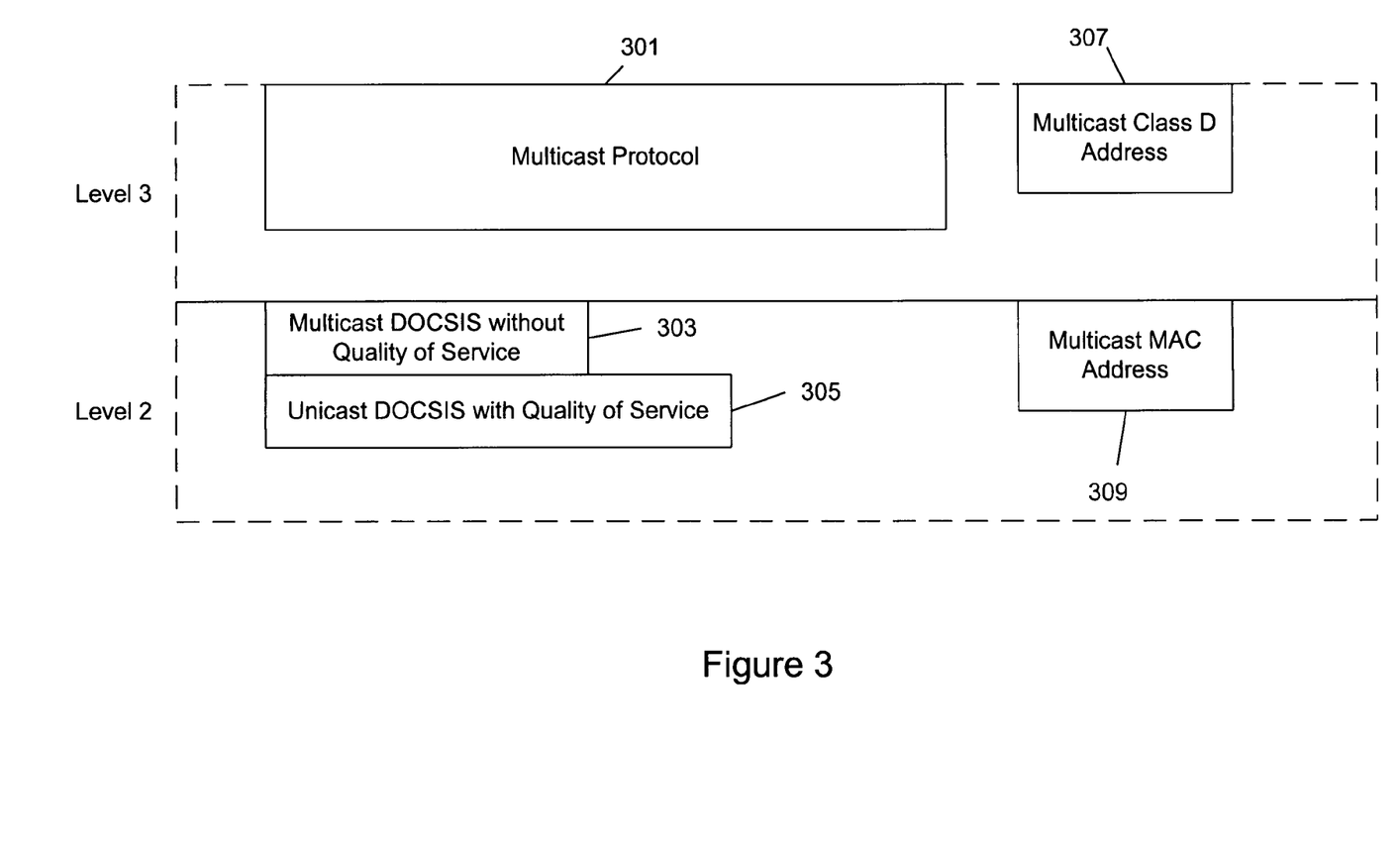
FIG. 3 is a diagram depicting the levels of the communication protocols and associated addresses that may be used to implement the present invention.

Multicast transmissions often include quality of service parameters in order to deliver on-demand video or voice at specified levels of quality. One protocol for handling multicast transmission with specified quality of service parameters, as represented in FIG. 3, is the Resource Reservation Protocol (RSVP) 301. RSVP is described in RFC 2205 ("RSVP Functional Specification") and several ancillary RFCs including 2206-7, 2210, 2380, and 2745-7 all of which have hereby been incorporated by reference for all purposes. RSVP 301 is a level 3 (network or IP layer) protocol allowing senders to transmit to multiple recipients while allowing receivers to join and leave freely. RSVP 301 efficiently uses bandwidth for multicast streams and supports the reservation of resources by clients across an IP network. Applications running on IP end systems such as server 201 can use RSVP to specify quality of service parameters such as bandwidth, jitter, maximum burst, and so forth to other nodes. Often multicast content requires certain minimum qualify of service settings to ensure that clients receive the content without degradation. Video content is one example of such content.

As mentioned, RSVP is a level three communication and represents one embodiment of a level three communication protocol that can provide quality of service specifications. A level three communication can correspond to Layer 3 of the OSI reference model. Transmissions at this level typically provide connectivity and path selection between two end systems. Level three is the layer at which routing usually occurs. A level 3 communication can also correspond to the path control layer of the SNA model.

The Internet Protocol (IP) specifies a special class of addresses (class D) for multicast traffic. Class D IP addresses are specially allocated. The high-order four bits of Class D IP addresses are set to "1110". This is followed by a 28-bit multicast group ID. Multicast group addresses range from 224.0.0.0 to 239.255.255.255. When a server 201 seeks to transmit a multicast stream onto the external network 203, it enters a multicast Class D IP address 307 into the packet headers, so that the routers connected to the external network understand that the video stream is a multicast transmission. The specific IP address chosen for the multicast transmission is determined by an external action like choice of some specific content by a user, which is associated in advance with a Class D address. RSVP specifies certain set up messages. An RSVP PATH message is sent to initiate an RSVP reservation. It typically consists of a Sender TSpec (traffic specification) which carries the QoS parameters (token bucket parameters: Token Rate, Token Bucket Size, Peak Data Rate, Minimum Policed Unit, Maximum Packet Size).

The Class D IP address (multicast program address) is specified in the Session Object, which is also part of the PATH message. The RSVP RESV message is a signal to indicate the actual reservation of resources to the sender. It contains a Session Object and Filter Spec and Flow Spec. The Filter Spec is a set of packet classification criteria to identify packets belonging to the RSVP flow corresponding to this message. The Flow Spec contains the receiver's QoS requirements for the (multicast) flow.

According to specific embodiments, another subtlety with respect to RSVP as used in this invention is that typically, RSVP communication happens between the endpoints of the flow. In this case, that would be the multicast server and the end host. However, this invention uses a slight variation of the protocol by using an RSVP "receiver proxy" that is implemented on the CMTS, which responds to RSVP messages on behalf of all end hosts it controls.

Although CMTS can receive level three communications such as an RSVP PATH message with quality of service information, DOCSIS 1.1 does not have provisions for mapping these quality of service parameters for multicast transmissions onto level 2. Consequently, all multicast streams are treated alike with only best effort data transmission. Provisions for handling quality of service exist for DOCSIS 1.1 unicast messages, but these provisions have not been extended to multicast transmissions. Even though the CMTS can associate a multicast MAC address 309 to the multicast Class D IP address 307 of the packet, no provisions for specifying what quality of service parameters to provide for a multicast packet exist. Thus the set of functions available in DOCSIS for unicast messages is greater than the set of functions available in DOCSIS for multicast messages.

This invention is not limited to RSVP multicast transmissions. In general, the multicast transmission of interest will be sent across the Internet or other large network (external to the cable network of interest) using a level 3 protocol that supports multicast transmissions. See level 3 multicast protocol 301 in FIG. 3. DOCSIS 1.1 manages transmissions at level 2 on the cable network. As shown in FIG. 3, DOCSIS 1.1 supports unicast transmissions 305 with associated quality of service parameters at level 2. DOCSIS 1.1 does not, however, support multicast transmissions with associated QoS parameters at level 2. As mentioned, DOCSIS is limited to applying "best efforts" in transmitting multicast content. The present invention provides a "fix" for DOCSIS (or other similarly deficient level 2 specification) by allowing multicast transmissions with associated QoS parameters at level 2. See block 303 of FIG. 3.

The block of Class D IP addresses may be drawn on to provided a specific IP address 307 representing a multicast stream. All routers in a path (e.g., a reserved path using RSVP) from the multicast content server to the cable network CMTS (or other network) recognize the chosen IP address 307 and forward it accordingly.

At level 2, multicast streams are supported by Ethernet and other protocols, which set aside a block of MAC addresses for multicast transmissions. Typically, end nodes (e.g., set top boxes or host computers) "join" multicast programs via a protocol such as IGMP. The end nodes so joined learn of the MAC address associated with the multicast transmission. A MAC address 309 associated with the multicast transmission is depicted in FIG. 3. Whenever a participating end node sees a packet with MAC address 309, it receives the packet. Those end nodes that are not participating in the multicast program see the packet, but ignore it by filtering.

Figure 4:
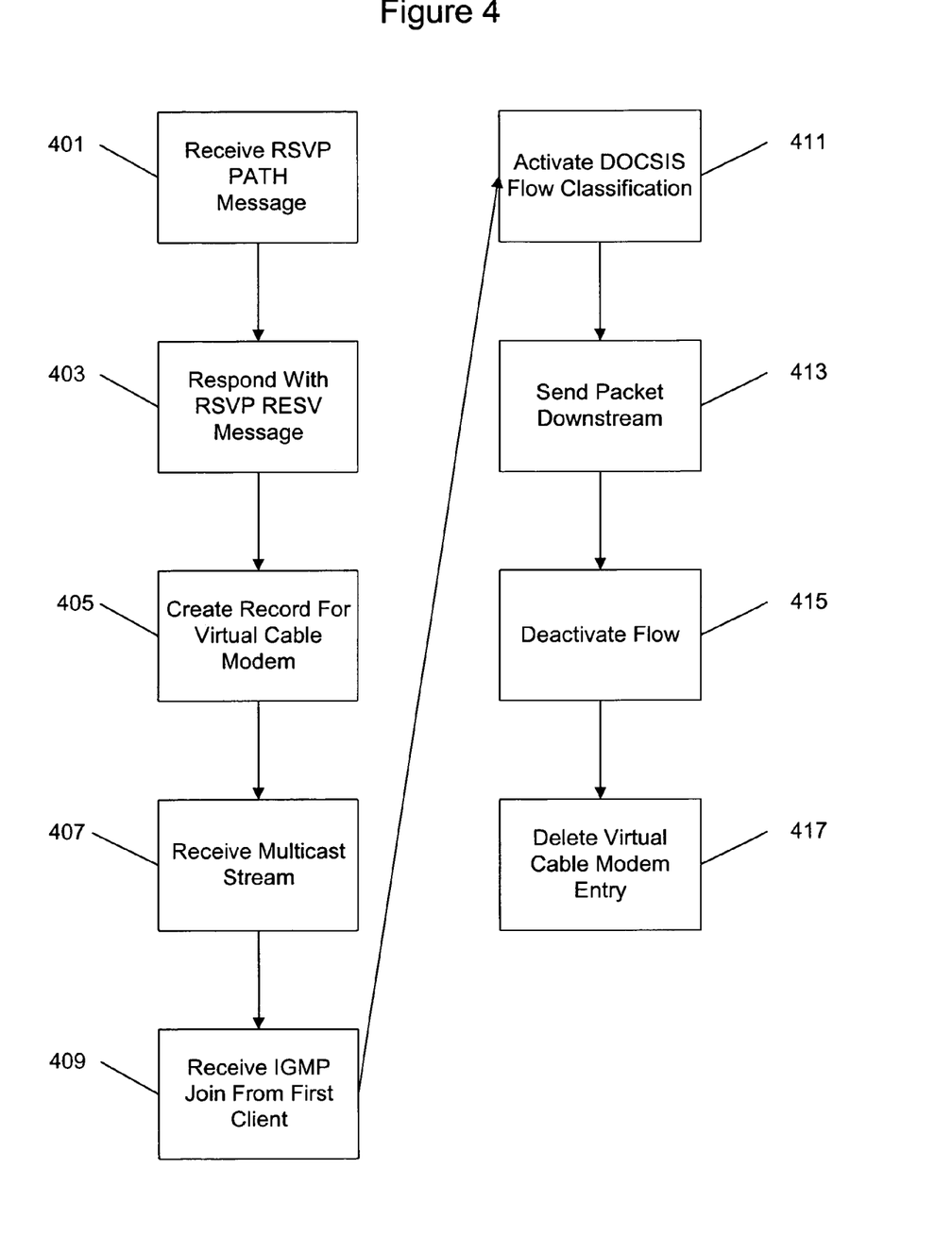
FIG. 4 is a process flow diagram illustrating the procedure for mapping multicast data stream quality of service parameters onto a cable network.

FIG. 4 presents a process flow diagram for providing quality of service to multicast message in accordance with an embodiment of this invention. In a preferred embodiment, the process is implemented on a headend, CMTS or other component that controls network traffic to a group of end nodes on a network.

Initially, the CMTS receives a PATH message 401 from the server that is providing the streaming content in response to which the CMTS sends a RESV message 403. The IP address corresponding to these messages is the destination IP address of the packets that should be transmitted to clients who request to receive the multicast data stream.

Figure 5A:
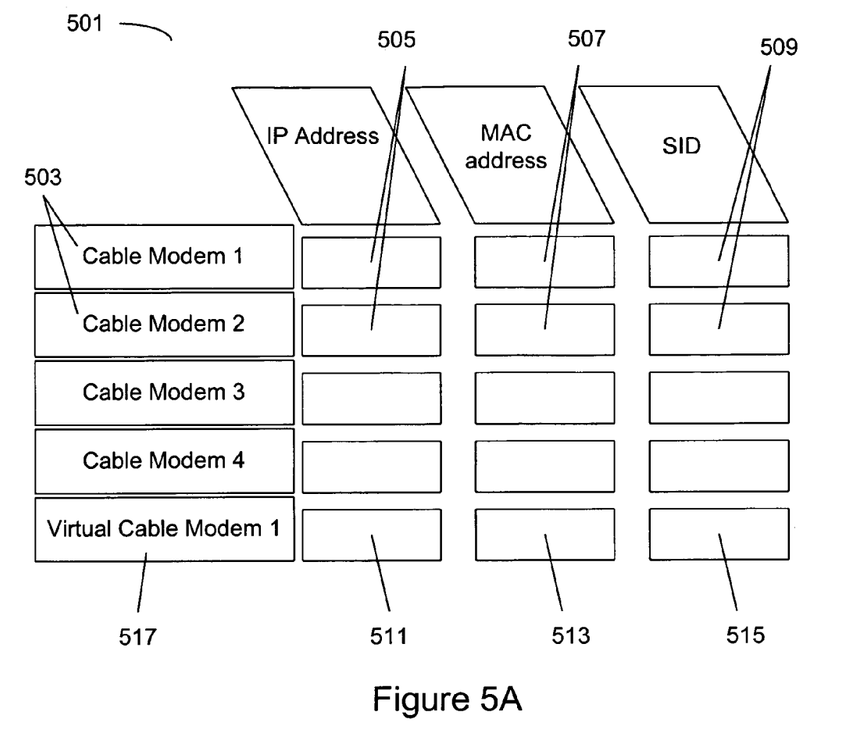
FIG. 5A is a block diagram showing a possible embodiment of a table of cable modems.

With this address and quality of service information, the CMTS can create a virtual cable modem 405. In a preferred embodiment, this is accomplished, at least in part, by creating an entry in a table of cable modems. FIG. 5A shows one embodiment of a table of cable modems 501. One embodiment of this table of active cable modems is often referred to as a "cable modem control block table," although this table of cable modems may be implemented in any manner that represents individual nodes on a network. The CMTS can use the table to store a record corresponding with each cable modem 503 in this table of cable modems 501. The record stored can include the IP address 505, MAC address 507, and SID 509 (a unique cable modem identifier as defined in DOCSIS). A number of other fields, flags, and substitute identifiers can also be included in this table. It will be understood that this information can be stored using a wide variety of methods. Many of these methods may be in software, however, firmware and hardware storage or a mix of the above is also possible. The table itself can be represented as a database table, multiple tables, an array of arrays, a list of linked lists, a hash table, or a host of other creative data structures, all of which are within the scope and possible embodiments of the present invention.

When an individual cable modem is connected to the network, a new entry in the control block table may be created with the cable modem's specific identifiers. Flags may also be toggled. The CMTS may also check whether the cable modem data has already been stored in the table of active cable modems 501. This table of cable modems 501 may actually include cable modems that were temporarily disconnected from the cable network 211. The CMTS can set toggles in these entries to indicate that the cable modem is indeed in standby. A single cable modem 503 can connect the CMTS and anything from a single PC, multiple hosts, or to a network of devices 209.

When a cable modem is removed from the cable network 211, the cable modem control block table entry can be deleted 417. The CMTS uses the information contained in the cable modem control block table in conjunction with information contained in classifier and flow lists or tables to associate received packets with specific quality of service parameters. As mentioned, DOCSIS specifies such lists as a mechanism for defining types of traffic and quality of service parameters associated with different types of traffic. These quality of service parameters may specify bandwidth requirements or maximum delays and direct the CMTS and its associated router to transmit, delay, or drop the packet.

Returning to FIG. 4, the CMTS receives an RSVP PATH message 401 in one embodiment of the present invention. The CMTS can extract the Class D IP address and quality of service information from the filter and flow specifications. The CMTS can then create a record for the multicast stream in the table of cable modems. Block 517 represents one embodiment of the virtual cable modem. Instead of storing the SID, IP and MAC addresses of a cable modem connected to hybrid fiber coax or cable network 211, the multicast data stream's IP address, MAC address, and a virtual SID can be stored in cell 511, 513, and 515 respectively. The multicast stream's IP address can be extracted from the RSVP RESV message. It may also be possible to extract similar information from other level 3 communications. In one embodiment of the present invention, the virtual SID needs only to be a handle by which the virtual cable modem or multicast stream can be identified. The CMTS can set this value when creating the virtual cable modem. Preferably, the SID is created from an ID space outside the range of SIDs used to designated real cable modems.

Figure 5B:
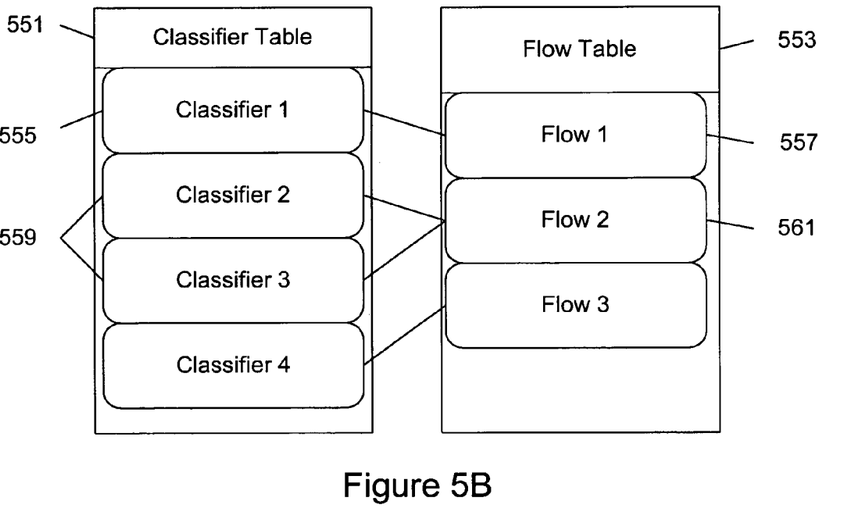
FIG. 5B is a block diagram depicting possible embodiments of a classifier table and a flow table associated with each cable modem.

FIG. 5B shows representations of classifier and flow tables 551 and 553 created per actual cable modem 503 or per virtual cable modem entry 517. The classifier table 551 and the flow table 553 can also be created once the RSVP PATH message has been received. It should be noted that some of the steps in the flow chart of FIG. 4 can be practiced in different sequences. For example, creation of the classifier 551 and flow tables 553 can occur before or after the creation of the record for a virtual cable modem 405 in the table of cable modems 501. These different sequences merely represent embodiments and fall within the scope of the present invention.

In DOCSIS, each cable modem is associated with its own classifier 551 and flow tables 553. As provided by DOCSIS, classifiers 555 categorize received data packets based on parameters such as IP address, port numbers, or protocol type. For example, a packet with a port number 80 is classified as web traffic on the Internet. Using this information, the CMTS associates this web traffic packet with an entry 557 in the flow table 553. Each entry in the flow table contains quality of service parameters. Note that several classifiers 559 can be mapped to a particular flow 561, but no two flows can be mapped to the same classifier. This results because each packet received can be associated with only one flow or correspondingly one set of quality of service parameters.

When an RSVP PATH message is received by the CMTS and a corresponding virtual cable modem entry 517 is created in the table of cable modems 501, a new classifier table 551 and a new flow table 553 associated with the virtual cable modem 517 is required. This classifier table 551 for the multicast stream may contain one or more classifier categories 555. The flow table 553 may contain one or more flow categories 557. Nonetheless, the flow table contains quality of service parameters that now can be associated with the multicast data stream, stored as an entry in the table of cable modems as a virtual cable modem.

Returning to FIG. 4, the CMTS or its associated router has received the multicast Class D IP address and quality of service parameters, possibly contained in an RSVP PATH message and has responded with an RSVP RESV message. The CMTS has entered a record for the multicast stream as a virtual cable modem in a cable modem table and has created a classifier table and a flow table containing quality of service parameters for the virtual cable modem entry. The CMTS may receive the multicast stream at this point 407.

The CMTS may then receive a request to join the multicast group from one of the cable modems within its cable network 211. In one embodiment of the present invention, this may take the form of an Internet Group Management Protocol (IGMP) JOIN message 409. IGMP is specified in RFC 1112 which is hereby incorporated by reference for all purposes. IGMP is a level three protocol. In an embodiment of this invention, IGMP runs between a host 209 and its nearby multicast routers 205. This protocol allows a host 209 to inform its local router 205 that it wishes to receive the contents of a particular data stream. If the local router 205 has already received the data stream, it can process the stream with DOCSIS. If it has not, the local router 205 must request that the multicast data stream be forwarded to its location.

In one embodiment of the present invention, the CMTS has multicast router capabilities. However, in other embodiments of the present invention, the CMTS may only be associated with a unicast router. An IGMP JOIN or a similar request however, would still function. The IGMP JOIN message would be routed from a host 209. This multicast router would then request that the multicast data stream be forwarded to its location.

Multicast routers such as a CMTS router 205 are configured to receive all multicast IP traffic. Multicast router 205 also only needs to know that at least one group member has joined a multicast transmission. In addition to processing requests to join a particular multicast transmission, multicast routers 205 periodically transmit queries to update their lists of hosts still joined to a particular multicast transmission.

After a CMTS 205 receives an IGMP JOIN from a cable modem 207 within its cable network 211 and retrieves packets from the multicast data stream a host connected to a cable modem 207 has requested, the CMTS associates the packet with a particular flow and its quality of service specifications. The CMTS reads the Class D IP address 511 of the multicast packet and records a virtual SID 515 in the packet header based on the multicast IP address. Using the virtual SID 515, the CMTS can locate the virtual cable modem entry 517 in the table of cable modems. The CMTS then accesses the classifier table 551 and can categorize the packet into a classifier 555. This classifier is then mapped onto a flow 557 in the flow table 553 associated with the virtual cable modem 517. This flow 557 contains quality of service parameters for the multicast packet.

This packet may then be queued, dropped, or transmitted based on a traffic shaping or policing algorithm. Effective traffic shaping algorithms include Weighted Fair Queueing, Self Clocked Fair Queueing, and Network Traffic Shaping using Time Based Queues. If the traffic shaping algorithm determines that the packet should be transmitted, the CMTS 205 sends the packet downstream onto the cable network 211.

When a CMTS 205 receives a message from a local host to stop transmitting a multicast stream, the CMTS may halt flow processing. One such message is an IGMP LEAVE from a local host connected to cable network 211. The CMTS 205 may send a query to check if any other hosts are still interested in receiving the multicast transmission. The CMTS may send this query several times at a specific interval. If the CMTS 205 recognizes that no hosts 209 still wish to receive the transmission, the CMTS 205 will deactivate flow processing. Packets from the multicast stream will no longer classified or associated with flows and quality of service parameters.

The CMTS 205 may halt flow processing in other ways. One example is that the CMTS 205 may recognize that there are no hosts still interested in receiving a multicast transmission by sending periodic queries onto the cable network 211. This recognition allows the CMTS to decrease bandwidth usage on the cable network 211.

The record for the virtual cable modem 517 remains in the table of cable modems 501 even after the hosts in a cable network 211 have indicated that they are no longer interested in receiving the multicast transmission. This virtual cable modem 517 entry in the table of cable modems remains because hosts in a cable network 211 can still request to receive the remainder of the multicast transmission.

The CMTS 205 can delete the virtual cable modem entry after it receives an indication that the multicast transmission has terminated. One such indication may be an RSVP PATH TEAR or RSVP TEAR message. If an RSVP TEAR message arrives, the CMTS 205 can extracts the Class D IP address and locate the virtual cable modem entry in the table of cable modems. The CMTS can then delete the virtual cable modem and along with its associated classifier and flow tables.

Alternatively, another example of an indication that the multicast transmission has terminated is the timeout of an RSVP PATH reservation. Although the virtual cable modem entry can be deleted from the table of cable modems at this point, this is not necessarily a requirement. Flags can be set to indicate inactivity for example, while maintaining the entry in the table of cable modems. An inactive entry in some embodiments of this invention may never need to be deleted, as it can be over written by future entries for either new cable modems connected to a cable network 211 or for other multicast transmissions.

Network Devices for Providing Quality of Service to Multicast Streams

Generally, the technique of the present invention may be implemented on software and/or hardware. For example, it can be implemented in an operating system kernel, in a separate user process, in a library package bound into network applications, on a specially constructed machine, or on a network interface card. In a specific embodiment of this invention, the methods of the present invention are implemented in software such as an operating system or in an application running on an operating system.

A software or software/hardware hybrid system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example.

Figure 6:
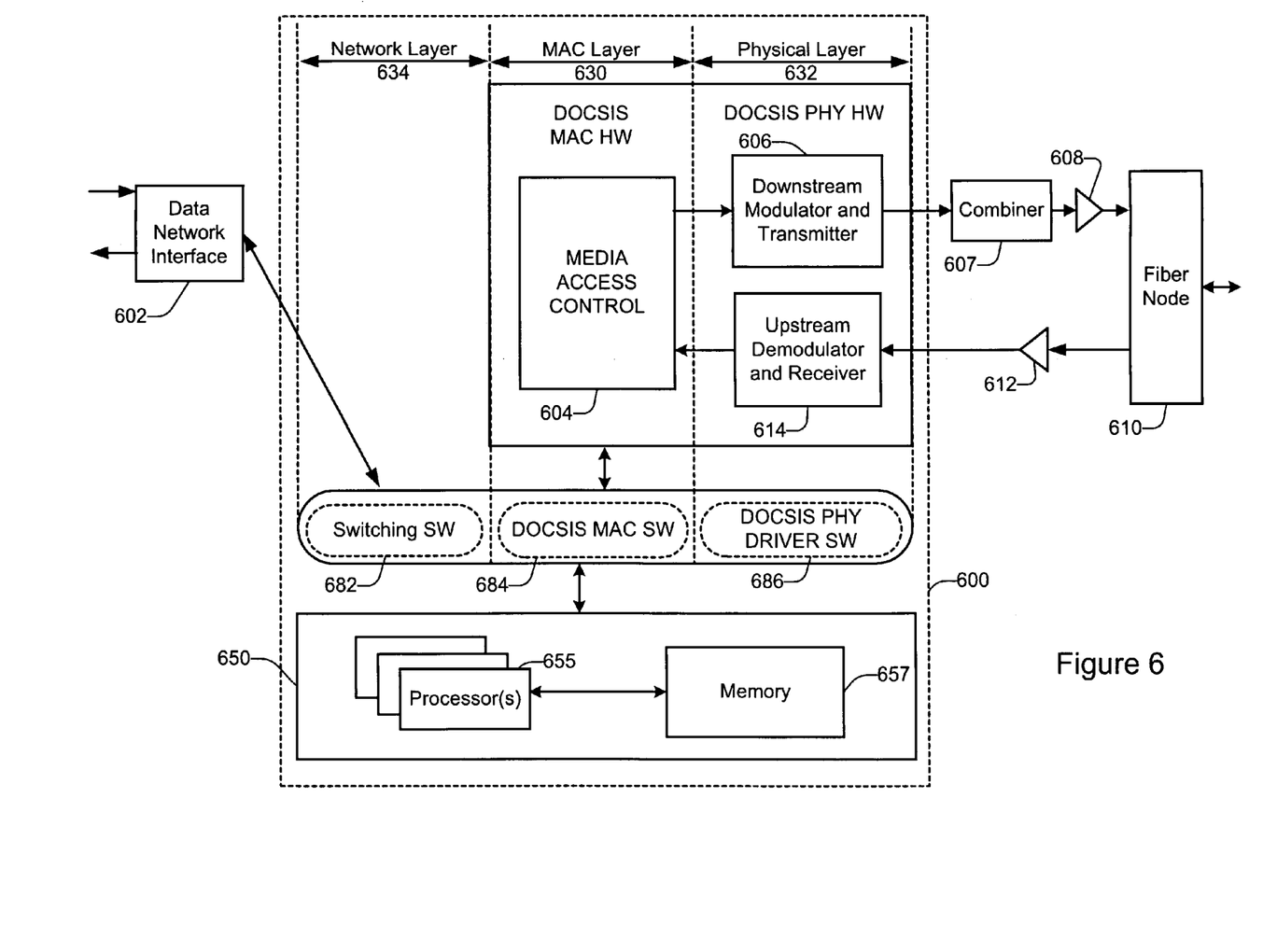
FIG. 6 is a block diagram of a cable modem termination system that may be employed to implement the present invention.

One important class of device that may be used to implement the present invention is the cable modem termination system. FIG. 6 depicts the basic components of a CMTS. A Data Network Interface 602 is an interface component between an external data source and the cable system. External data sources transmit data to data network interface 602 via optical fiber, microwave link, satellite link, or through various other media. Also as mentioned above, a Media Access Control Block (MAC Block) 604 receives data packets from a Data Network Interface 602 and encapsulates them with a MAC header.

In a specific embodiment as shown in FIG. 6, CMTS 205 provides functions on three network layers including a physical layer 632, a Media Access Control (MAC) layer 630, and a network layer 634. Generally, the physical layer is responsible for receiving and transmitting RF signals on the cable plant. Hardware portions of the physical layer include a downstream modulator and transmitter 606 and an upstream demodulator and receiver 614. The physical layer also includes software 686 for driving the hardware components of the physical layer.

Once an information packet is demodulated by the demodulator/receiver 614, it is then passed to MAC layer 630. A primary purpose of MAC layer 630 is to encapsulate and decapsulate packets within a MAC header, preferably according to the above-mentioned DOCSIS standard for transmission of data or other information.

MAC layer 630 includes a MAC hardware portion 604 and a MAC software portion 684, which function together to encapsulate information packets with the appropriate MAC address of the cable modem(s) on the system. After the upstream information has been processed by MAC layer 630, it is then passed to network layer 634. Network layer 634 includes switching software 682 for causing the upstream information packet to be switched to an appropriate data network interface on data network interface 602.

When a packet is received at the data network interface 602 from an external source, the switching software within network layer 634 passes the packet to MAC layer 630. MAC block 604 transmits information via a one-way communication medium to downstream modulator and transmitter 606. Downstream modulator and transmitter 606 takes the data (or other information) in a packet structure and converts it to modulated downstream frames, such as MPEG or ATM frames, on the downstream carrier using, for example, QAM 64 modulation (other methods of modulation can be used such as CDMA (Code Division Multiple Access) OFDM (Orthognal Frequency Divison Multiplexing), FSK (FREQ Shift Keying)). The return data is likewise modulated using, for example, QAM 16 or QSPK. Data from other services (e.g. television) is added at a combiner 607. Converter 608 converts the modulated RF electrical signals to optical signals that can be received and transmitted by a Fiber Node 610 to the cable modem hub.

It is to be noted that alternate embodiments of the CMTS (not shown) may not include network layer 634. In such embodiments, a CMTS device may include only a physical layer and a MAC layer, which are responsible for modifying a packet according to the appropriate standard for transmission of information over a cable modem network. The network layer 634 of these alternate embodiments of CMTS devices may be included, for example, as part of a conventional router for a packet-switched network.

In a specific embodiment, the network layer of the CMTS is configured as a cable line card coupled to a standard router that includes the physical layer 632 and MAC layer 630. Using this type of configuration, the CMTS is able to send and/or receive IP packets to and from the data network interface 602 using switching software block 682. The data network interface 602 is an interface component between external data sources and the cable system. The external data sources transmit data to the data network interface 602 via, for example, optical fiber, microwave link, satellite link, or through various media. The data network interface includes hardware and software for interfacing to various networks such as, for example, Ethernet, ATM, frame relay, etc.

As shown in FIG. 6, CMTS 504 includes a hardware block 650 including one or more processors 655 and memory 657. These hardware components interact with software and other hardware portions of the various layers within the CMTS. Memory 657 may include, for example, I/O memory (e.g. buffers), program memory, shared memory, etc. Hardware block 650 may physically reside with the other CMTS components.

In one embodiment, the software entities 682, 684, and 686 are implemented as part of a network operating system running on hardware 650. Further, the provisions of this invention for providing quality of service for multicast streams are preferably implemented in software as part of the operating system.

The methods of this present invention may be implemented on various systems. For example, the invention may be implemented on routers and/or switches. In a specific embodiment, the systems of this invention may be specially configured routers such as, for example, specially configured router models 1600, 2500, 2600, 3600, 4500, 4700, 7200, and 7500 available from Cisco Systems, Inc. of San Jose, Calif. A general architecture for some of these machines will be given below. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Figure 7:
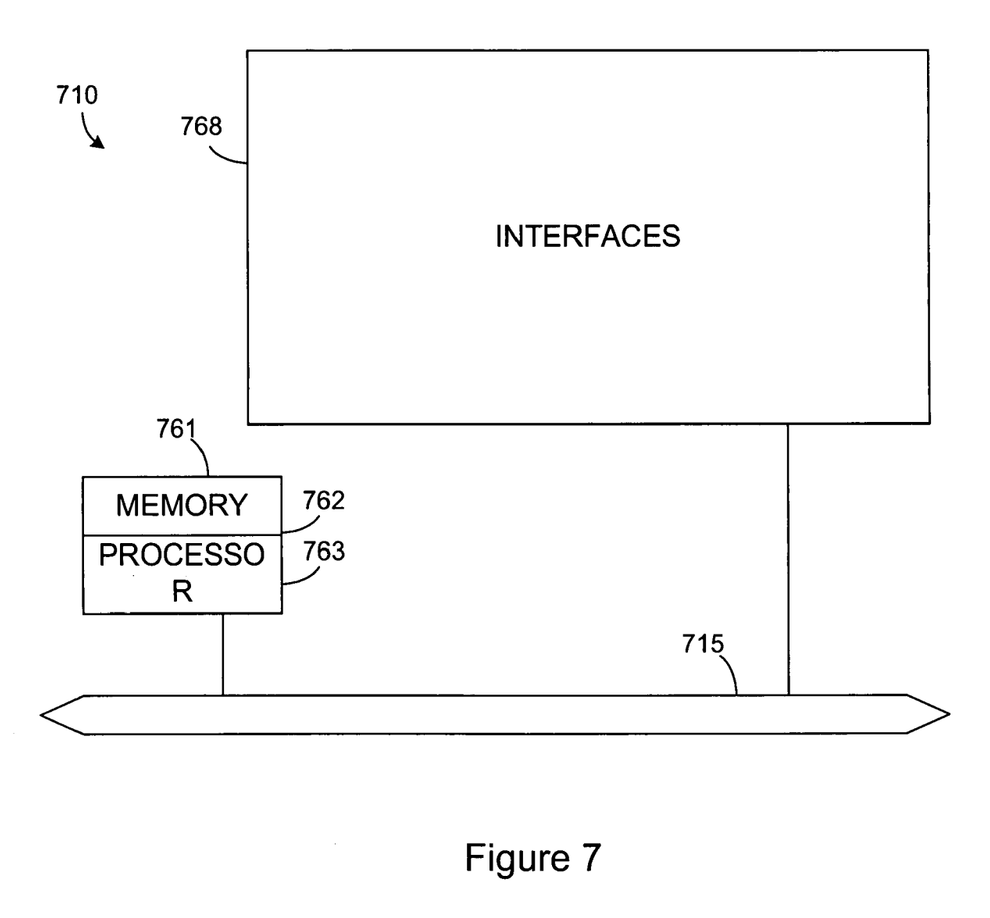
FIG. 7 is a block diagram of a router that may be used in conjunction with the methods of the present invention.

Referring now to FIG. 7, a general purpose router 710 suitable for implementing the present invention includes a master central processing unit (CPU) 762, interfaces 768, and a bus 715 (e.g., a PCI bus). When acting under the control of appropriate software or firmware, the CPU 762 is responsible for such router tasks as routing table computations and network management. It may also be responsible for creating virtual cable modems and associating these virtual cable modems with multicast streams, for example. It preferably accomplishes all these functions under the control of software including an operating system (e.g., the Internetwork Operating System (IOS®) of Cisco Systems, Inc.) and any appropriate applications software. CPU 762 may include one or more processors 763 such as a processor from the Motorola family of microprocessors or the MIPS family of microprocessors. In an alternative embodiment, processor 763 is specially designed hardware for controlling the operations of router 710. In a preferred embodiment, a memory 761 (such as non-volatile RAM and/or ROM) also forms part of CPU 762. However, there are many different ways in which memory could be coupled to the system.

The interfaces 768 are typically provided as interface cards (sometimes referred to as "line cards"). Generally, they control the sending and receiving of data packets over the network and sometimes support other peripherals used with the router 710. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 762 to efficiently perform routing computations, network diagnostics, security functions, etc.

Although the system shown in FIG. 7 is one specific router of the present invention, it is by no means the only router architecture on which the present invention can be implemented. For example, an architecture having a single processor that handles communications as well as routing computations, etc. would also be acceptable. Further, other types of interfaces and media could also be used with the router.

Regardless of network device's configuration (for cable plants or otherwise), it may employ one or more memories or memory modules (e.g., memory 761) configured to store program instructions for the network operations and other functions of the present invention described herein. The program instructions may specify an operating system and one or more applications, for example. Such memory or memories may also be configured to store data structures or other specific non-program information described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed with a variety of communication protocols and should not be restricted to the ones mentioned above. The cable network headend also has a variety of embodiments which include a cable modem termination system coupled to a router or a multicast router. In addition and as mentioned above, the invention may be implemented in both differential and single-ended configurations. Therefore, the scope of the invention should be determined with reference to the appended claims.

What is claimed is:

1. A cable network headend, comprising:
    a packet network interface operable to receive a message including quality of service information associated with a multicast transmission;
    a processor operable to create a virtual cable modem associated with the quality of service information and apply the quality of service information to the multicast transmission by referencing the virtual cable modem; and
    a cable network interface operable to introduce the multicast transmission onto a cable network.

2. The cable network headend of claim 1, wherein the message is an RSVP PATH message.

3. The cable network headend of claim 2, wherein the one or more quality of service parameters are used to provide controlled delay, guaranteed service, and predictive service.

4. The cable network headend of claim 1, wherein creating a virtual cable modem comprises creating a record of the virtual cable modem in a table of cable modems maintained at the cable network headend.

5. The cable network headend of claim 4, wherein the table of cable modems includes the IP addresses of cable modems connected to the cable network headend.

6. The cable network headend of claim 4, wherein the record identifies the virtual cable modem by a protocol specified multicast address.

7. The cable network headend of claim 6, wherein the protocol specified multicast address is a Class D IP address.

8. The cable network headend of claim 1, wherein creating a virtual cable modem comprises creating a flow list associated with the virtual cable modem and specifying the quality of service parameters for the multicast transmission.

9. The cable network headend of claim 8, wherein creating a virtual cable modem further comprises specifying a classifier list specifying types of traffic that may be received by the virtual cable modem.

10. A method for providing quality of service to a multicast transmission on a cable network, the method comprising:
    receiving a message at a cable network headend, the message including one or more quality of service parameters for the multicast transmission;
    creating a virtual cable modem and associating the one or more quality of service parameters with the virtual cable modem; and
    applying the one or more quality of service parameters to the multicast transmission at the cable network headend.

11. The method of claim 10, wherein the message is an RSVP PATH message.

12. The method of claim 11, wherein the one or more quality of service parameters are used to provide controlled delay, guaranteed service, and predictive service.

13. The method of claim 10, wherein creating a virtual cable modem comprises creating a record of the virtual cable modem in a table of cable modems maintained at the cable network headend.

14. The method of claim 13, wherein the table of cable modems includes the IP addresses of cable modems connected to the cable network headend.

15. The method of claim 13, wherein the record identifies the virtual cable modem by a protocol specified multicast address.

16. The method of claim 15, wherein the protocol specified multicast address is a Class D IP address.

17. The method of claim 10, wherein creating a virtual cable modem comprises creating a flow list associated with the virtual cable modem and specifying the quality of service parameters for the multicast transmission.

18. The method of claim 17, wherein creating a virtual cable modem further comprises specifying a classifier list specifying types of traffic that may be received by the virtual cable modem.

19. A computer readable storage medium comprising computer code embodied therein, the computer readable storage medium comprising:
   computer code for receiving a message at a cable network headend, the message including one or more quality of service parameters for the multicast transmission;
   computer code for creating a virtual cable modem and associating the one or more quality of service parameters with the virtual cable modem; and
   computer code for applying the one or more quality of service parameters to the multicast transmission at the cable network headend.

20. A network device for providing quality of service to a multicast transmission on a cable network, the apparatus comprising:
   means for receiving a message at the network device, the message including one or more quality of service parameters for the multicast transmission;
   means for creating a virtual cable modem and associating the one or more quality of service parameters with the virtual cable modem; and
   means for applying the one or more quality of service parameters to the multicast transmission at the network device.

* * * * *